J. C. BARR.
WATER PURIFYING PLANT.
APPLICATION FILED JUNE 20, 1911. RENEWED MAY 3, 1913.

1,069,368.

Patented Aug. 5, 1913.

Witnesses

Joseph Corroll Barr. Inventor

UNITED STATES PATENT OFFICE.

JOSEPH CARROLL BARR, OF JOPLIN, MISSOURI.

WATER-PURIFYING PLANT.

1,069,368.  Specification of Letters Patent.  Patented Aug. 5, 1913.

Application filed June 20, 1911, Serial No. 634,350. Renewed May 3, 1913. Serial No. 765,396.

*To all whom it may concern:*

Be it known that I, JOSEPH CARROLL BARR, a citizen of the United States, residing at Joplin, in the county of Jasper and State of Missouri, have invented certain new and useful Improvements in Water-Purifying Plants, of which the following is a specification.

The present invention relates to a plant or apparatus for the purification of water, and the object is to provide a plant or apparatus that will carry out the methods employed by nature in the purification of water, so as to obtain a product in a highly purified state, the plant moreover being comparatively inexpensive and readily adaptable to various conditions.

One embodiment of the invention is illustrated in the accompanying drawings, wherein:—

Figure 1:
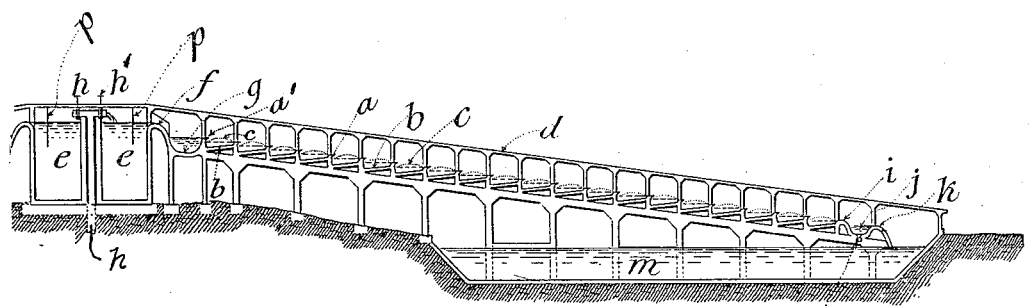
Figure 2:
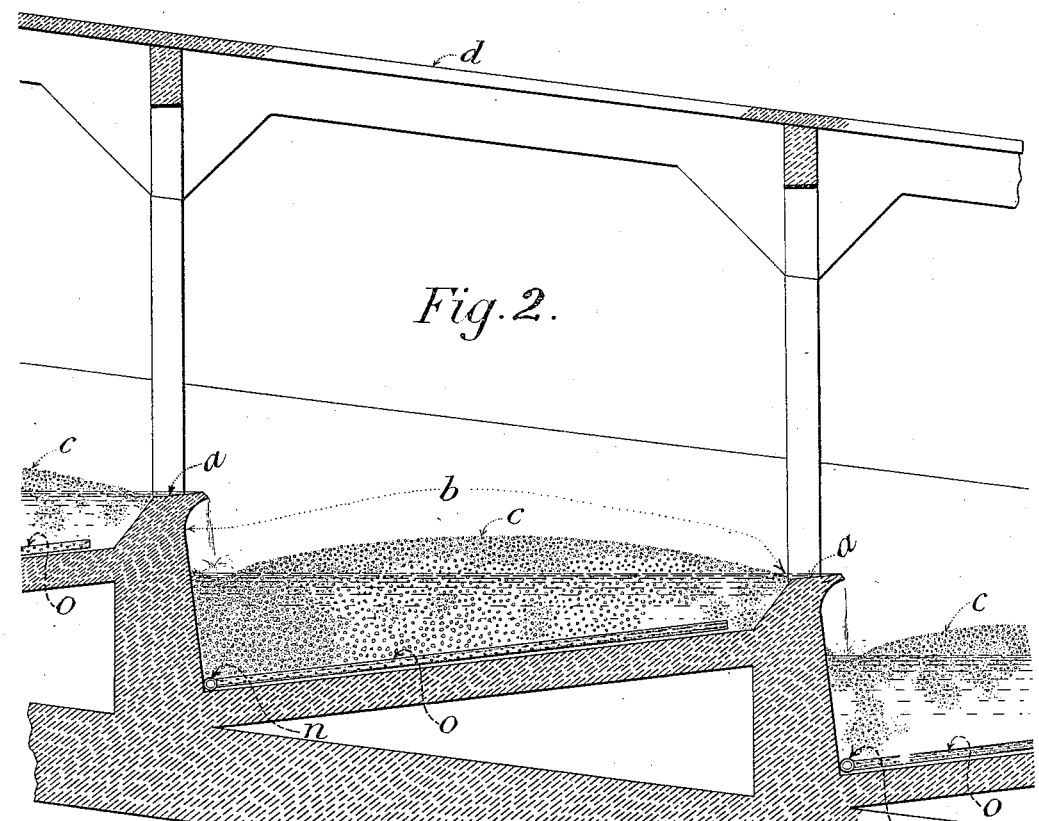

Figure 1 is a section of a water purifying plant embodying the improvements forming the subject matter of the application. Fig. 2 is a detail sectional view on an enlarged scale of one of the sedimentation and filtration basins, with its skimming weir and roof covering.

Similar reference numerals designate corresponding parts in all the figures of the drawings.

In the structure disclosed, a stepped series of sedimentation and filtration basins $b$ is employed, each basin having along its lower side a skimming weir $a$ that overhangs the next lower basin. The bottoms of these basins incline downwardly away from their respective weirs. In each basin is placed filtering or screening material $c$ that is mounded up to a height above the upper edge of the skimming weir. At the upper end of the series of basins, is a distributing canal $g$, and the wall that separates said canal from the uppermost basin is also in the form of a skimming weir $a'$. The opposite wall $f$ is in the form of a rounded weir, separating the distributing canal $g$ from a receiving chamber $e$. This chamber $e$ contains a depending baffle plate $p$ that extends downwardly below the level of the water in the receiving chamber $e$. The water is supplied to the chamber $e$ through a pipe $h$ controlled by a valve $h'$. The lower portion of the series of basins, in the form shown, extends over a receiving reservoir $m$, that contains the purified water, and interposed between the lowermost basin and this reservoir is a collecting canal $j$ having walls $i$ and $k$, the latter being overflowed by the water from the lowermost basin, and the water from the collecting canal $j$ overflowing $k$ into the reservoir $m$. The stepped series of basins is provided with a roof or cover $d$ to exclude the light and weather.

In order to effect the cleaning of the filtering material $c$ in the basins $b$, water distribution pipes $n$ extend along the bottoms of said basins and have branches $o$ disposed transversely of said bottoms, and provided with perforations.

The collecting canal $j$ is provided in its bottom with a drain pipe $l$. The pipes $n$ and $l$, are provided with suitable controlling valves, not shown.

The plant disclosed, has oppositely extending sets of basins $c$, only one being illustrated in Fig. 2, with the receiving chamber $c$ for the other shown.

The water to be purified enters the receiving chamber $e$, (Fig. 1) through the valve $h$, whence it passes under the baffle plate $p$ and over the weir $f$, into the distributing canal $g$. From the distributing canal $g$, the water falls in a thin sheet over the skimming weir $a'$ into the first sedimentation and filtration basin $b$. Passing through the filtering material in basin $b$ the water flows over the next lower skimming weir $a$, falling in a thin sheet into the next lower sedimentation and filtration basin $b$, passes through the filtering or screening material $c$, and continues its descent over each succeeding lower weir, and through each succeeding lower sedimentation and filtration basin $b$ and its contained filtering or screening materials $c$, until it reaches the weir $i$, over which it descends into the collecting canal $j$. From the collecting canal $j$, the water passes over the weir $k$, into the clear water reservoir $m$, from which it passes into the distribution system.

The cleaning of the filter beds is accomplished by passing water, under pressure, through the perforated pipes $n$ and $o$. The wash-water thus used in cleaning the filter with the silt and other foreign matter collected, is allowed to pass off through the drain pipe $l$.

With this structure, inasmuch as the water passes in a thin sheet over the skimming weir, only the top volume or the purified water from the preceding sedimentation and filtration basin is received in the next basin, while the fouler water that collects in the bottom of the basin is held back, and thorough sedimentation promoted by reason of the fact that the bottom of each basin *b* inclines downwardly in a direction opposite to the direction of flow. This purer water, it will be observed, is passed horizontally through the filtering material above the lower body of impure water, and is thus continuously purified as it passes through the system, and as this water falls through the air, it is mixed therewith, enabling the bacteria to decompose both the suspended and dissolved organic matter contained in the water. Furthermore by thus mixing the water with the air, as it passes over the weirs, the water becomes charged with dissolved oxygen, and in this state, passes through the filtering materials, where the bacteria work with great activity in decomposing the organic matter. In addition, as the water must of necessity pass through the filtering material, it is thoroughly screened, and sedimentation thus takes place. By having a successive series of these basins, the processes described, are repeated, until a high condition of purity is reached, without the use of chemicals or coagulants. The arrangement furthermore permits the cleaning of the filtering material without removing it from its bed, and the plant possesses great flexibility of design to meet local conditions or demands for increased capacity, while it may be employed as a cover or an adjunct to an existing reservoir, as clearly shown in Fig. 1. A structure of this kind furthermore can be installed and operated at comparatively small expense, and it has the additional advantage of causing the water to flow through the filtering material horizontally, instead of vertically, as is the present general practice.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or scope of the invention.

Having thus fully described my invention, what I claim as new, and desire to secure by Letters Patent, is:—

1. In a water purifying plant, the combination with a water supply, of a series of stepped basins, each having means for restraining the body of water therein to effect sedimentation and the retention of foul water, a filtering material located in each basin, and means for causing the water to flow horizontally through the filtering material and for skimming the surface film of filtered water and to cause such film to flow through the air into the next succeeding basin.

2. In a water purifying plant, the combination with a series of stepped basins, each having a skimming weir along its lower side, and a bottom that inclines downwardly away from such weir in a direction opposite to the direction of flow, and means for delivering water to be purified to the uppermost basin.

3. In a water purifying plant, the combination with a series of stepped basins, each having a skimming weir along its lower side that delivers to the next lower basin and furthermore having a bottom that inclines downwardly away from such weir in a direction opposite to the direction of flow, of filtering material located in each basin and rising to a point higher than the upper edge of its weir, and means for delivering water to be purified to the uppermost basin.

4. In a water purifying plant, the combination with a series of stepped basins, each having a skimming weir along its lower side that delivers to the next lower basin and furthermore having a bottom that inclines downwardly away from such weir in a direction opposite to the direction of flow, of filtering material located in each basin and rising to a point higher than the upper edge of its weir, means for delivering water to be purified to the upper basin, said means including a distributing canal extending alongside the uppermost basin and overflowing thereinto, a receiving reservoir located at the lower end of the series, pipes located in the bottom of each basin for delivering cleansing fluid upwardly through the filtering material, a collecting canal interposed between the lowermost basin and the receiving reservoir, and means for drawing off the cleaning fluid and the sediment carried thereby from said collecting canal.

In testimony whereof I hereunto affix my signature in the presence of two witnesses.

JOSEPH CARROLL BARR.

Witnesses:
Wm. S. Reeves,
Chas. Wells.